United States Patent [19]

Deon et al.

[11] Patent Number: 4,722,257
[45] Date of Patent: Feb. 2, 1988

[54] APPARATUS FOR CUTTING THREADED RODS

[75] Inventors: Jean-Pierre Deon; Michel Gerard, both of Vendeuvre, France

[73] Assignee: Applications Industrielles de Champagne S.A., Aulnay, France

[21] Appl. No.: 915,515

[22] Filed: Oct. 6, 1986

[30] Foreign Application Priority Data

Oct. 7, 1985 [FR] France ................. 85 14908

[51] Int. Cl.⁴ ............ B23D 23/00; B23D 15/04; B26D 3/16
[52] U.S. Cl. ........................ 83/605; 83/694; 83/701; 83/925 R; 30/226; 30/233; 30/251; 269/270
[58] Field of Search ............ 83/605, 604, 382, 701, 83/925 R, 694; 269/270; 10/110; 30/251, 226, 233

[56] References Cited

U.S. PATENT DOCUMENTS

| | | | |
|---|---|---|---|
| 959,035 | 5/1910 | Taylor | 83/925 R X |
| 1,137,093 | 4/1915 | Simonsen | 83/605 X |
| 1,623,689 | 5/1924 | Lind | |
| 2,850,926 | 9/1958 | Jobe | 269/270 X |
| 3,089,241 | 5/1963 | Batdorf | 30/226 |
| 3,495,331 | 2/1970 | Riggs | 30/233 |

FOREIGN PATENT DOCUMENTS

| | | |
|---|---|---|
| 1201334 | 12/1959 | France . |
| 1463766 | 11/1966 | France . |
| 2078868 | 11/1971 | France . |

*Primary Examiner*—Donald R. Schran
*Attorney, Agent, or Firm*—Cushman, Darby & Cushman

[57] ABSTRACT

The invention relates to an apparatus for cutting threaded rods.

This apparatus essentially comprises a frame (1) to which a square (2) is fixed by a bolt (6), the said square having a semicylindrical threaded nest (2a) at the top, and to which a moving part (3) is jointed, the said moving part being provided at the bottom with another semicylindrical threaded nest (3a) arranged opposite the one (2a) located in the fixed part (2). The moving part (3) is actuated by a force-multiplying lever (4).

The threaded nests (2a and 3a) come to bear against the threaded rod (5) at the moment when cutting takes place, so as to preserve the integrity of the thread of the threaded rod (5).

Application: building industry.

5 Claims, 2 Drawing Figures

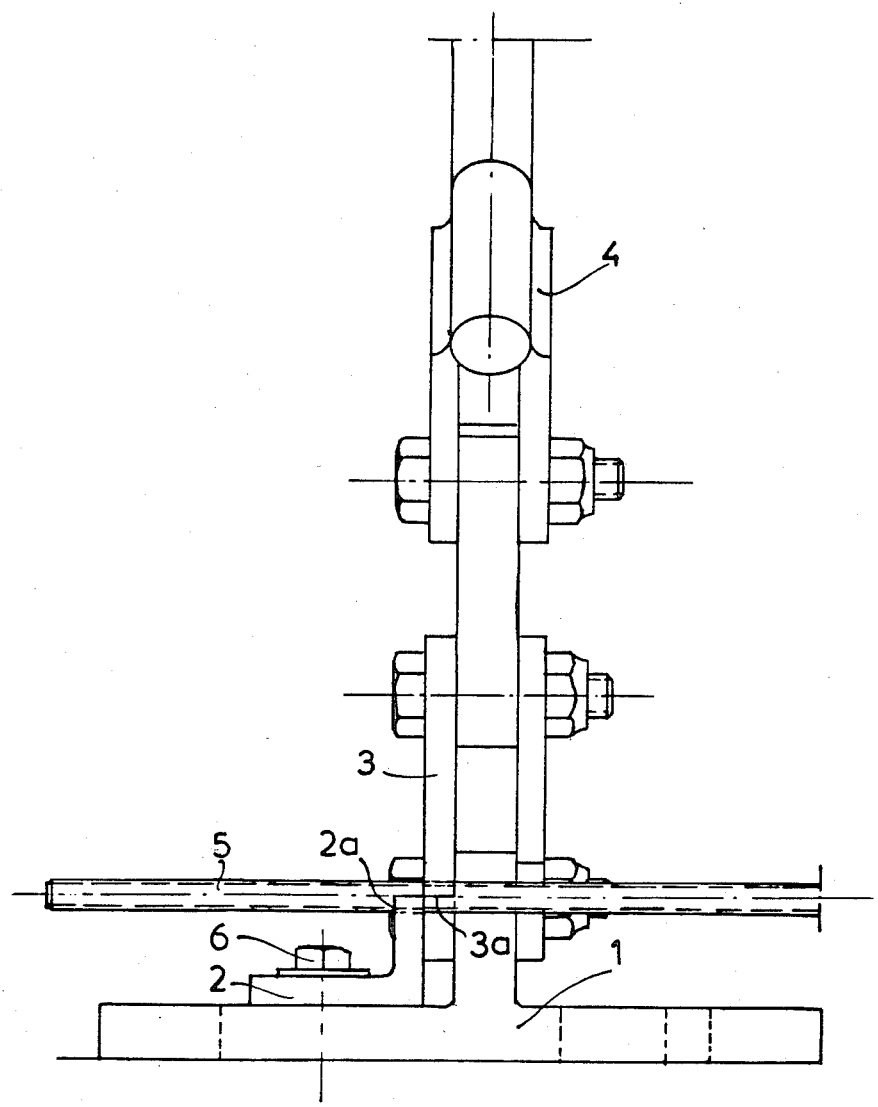

APPARATUS FOR CUTTING THREADED RODS

The present invention relates to an apparatus for cutting threaded rods.

In the interior building industry, it is known to construct false ceilings with panels suspended from the framework by means of threaded rods of different lengths, washers and nuts. The threaded rods are cut, as required, using a metal saw or, in the case of small diameters, using standard or special cutting pliers.

Devices for cutting threaded rods are already known which correspond to the precharacterizing clause of claim 1 as described in the following patent documents:

FR-A-1-201.334 relating to a device for shearing bolts, which comprises: a shearing edge arranged so as to cooperate with the base element, a system making it possible to position a threaded rod for the purpose of shearing it, in such a way that the shearing angle is substantially equal to the angle of the plane of the thread spiral, and a cavity produced in the base element and located essentially on the opposite side of the threaded rod to that on which the shearing edge is located. This device requires the threaded rod to be inserted in the cavity provided in the base element, which is disadvantageous in the case of long threaded rods, and despite the special shape of the shearing edge, a deformation of the thread results in the cutting plane, which does not allow the nuts to be fitted directly and effortlessly to the rod and makes it necessary to use a wrench.

FR-A-1.463.766 relating to a device for cutting threaded bolts or screws, which comprises a part for holding the screw and a part for cutting it, the said parts being assembled so as to slide against one another, the member for holding the screw having at least one threaded hole covered by the shearing part. This device therefore requires the threaded rod to be screwed in over the entire length of the section to be obtained, before the rod is cut, which represents a waste of time and a considerable inconvenience without even eliminating the risks of deformation of the thread in the cutting plane. As with the device referred to above, this deformation leads to difficulties in placing the nuts on the rod and makes it necessary to use a wrench.

The object of the present invention is to overcome these disadvantages. The invention, as characterized in the claims, solves the problem of cutting a threaded rod, irrespective of its length, by directly placing the cutting device transversely, without deforming the thread in the cutting plane.

The advantages obtained by virtue of this invention essentially consist of the fact that the cutting takes place directly, without a prior operation to introduce the threaded rod into the device, by using the thumb of one hand to position it against the fixed part of the apparatus, and the fact that the nut or nuts can be fitted and screwed on by hand, without proceeding by trial and error or needing a wrench, until they have reached their definitive position.

The main feature of the apparatus according to the invention is that it comprises a fixed part provided at the top with a semicylindrical threaded nest, and a moving part provided at the bottom with another semicylindrical threaded nest arranged opposite the one located in the fixed part, produced with the same thread as that corresponding to the rods to be cut.

The moving part slides against the fixed part, being jointed to a frame under the action of a lever-type force multiplier.

The fixed part consists of a square bolted to the frame.

The threaded nests coincide with the thread of the rods to be cut, when they are applied to the latter.

The fixed and moving parts can have several threaded nests corresponding to different diameters.

Further characteristics and advantages will become apparent from the following description of an apparatus for cutting threaded rods, which is constructed according to the invention and given by way of a non-limiting example with reference to the attached drawings; in these drawings:

FIG. 2 shows a front view of the apparatus under the same conditions as in FIG. 1.

Figure 1:
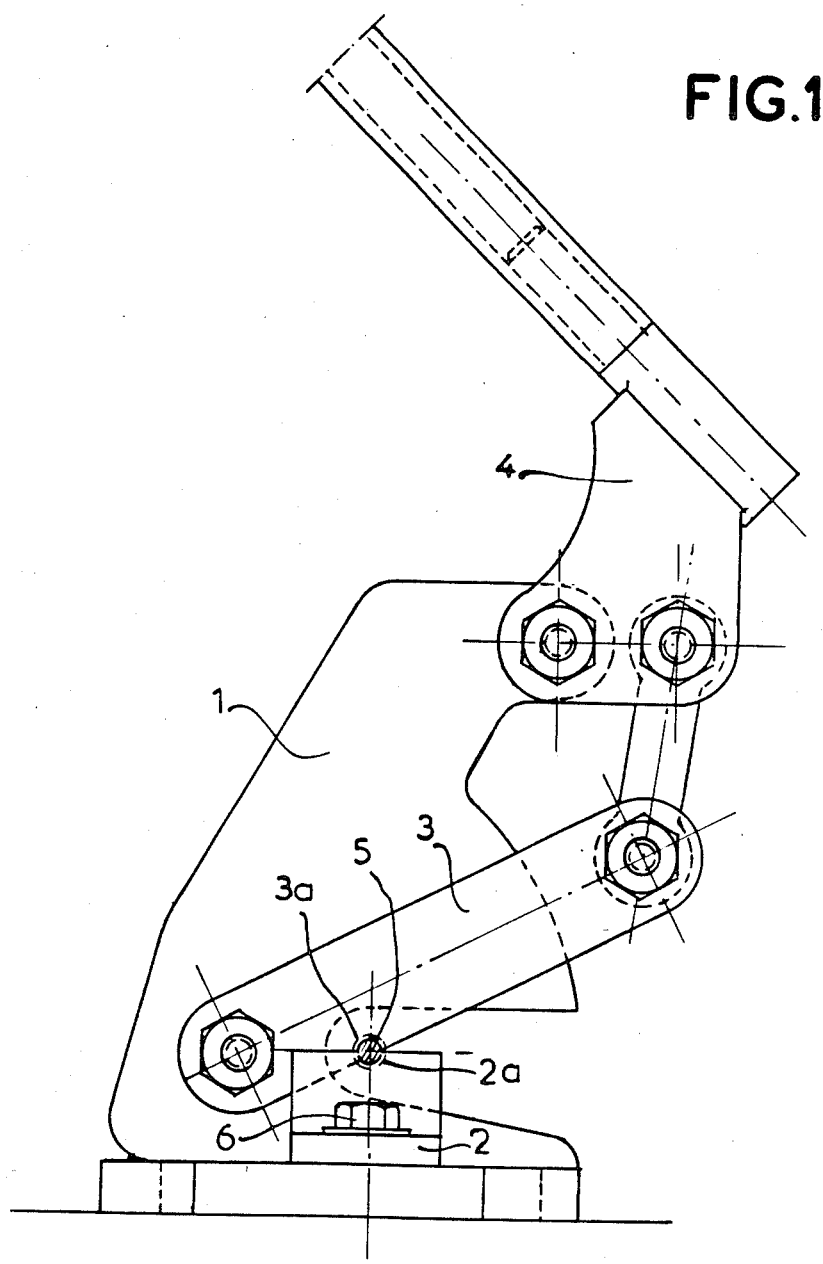
FIG. 1 shows a side view of the apparatus at the moment when the threaded nests come into contact with the rod.

The figures show an apparatus for cutting threaded rods which essentially comprises a frame 1 to which a square 2 is fixed by a bolt 6, the said square having a semicylindrical threaded nest 2a at the top, and to which a moving part 3 is jointed, the said moving part being provided at the bottom with another semicylindrical threaded nest 3a arranged opposite the nest 2a located in the fixed part 2. The moving part is actuated by a force-multiplying lever. The threaded nests (2a and 3a) come to bear against the threaded rods 5.

According to the present invention, the threaded rod 5 is placed on the nest 2a using a thumbnail to align the chosen cutting plane with the inner edge of the threaded nest 2a, and the lever 4 is then actuated so as to articulate the moving part 3 and bring its threaded nest 3a to bear against the threaded rod 5. It is then necessary only to increase the force exerted on the lever 4 in order to cut the threaded rod 5 cleanly and accurately. The rod sections obtained can very easily be released since they are totally free once cutting has taken place.

The fixed part 2 and moving part 3 can obviously have several juxtaposed nests corresponding to different diameters of threaded rods. As regards the question of cutting force, it is sufficient simply to arrange the threaded nests in increasing order of diameters in the direction of the jointing axis of the moving part 3.

The apparatus according to the invention is mainly intended for cutting, as required, the threaded rods used in the interior building industry, especially for fixing false ceilings.

What is claimed is:

1. An apparatus for cutting threaded rods, with a lever-type force multiplier, the apparatus comprising a frame, a fixed part removably mounted on the frame, said fixed part having an upper end, said upper end having a semi-cylindrical threaded first nest (2a), said frame carrying a moving part, said moving part having a bottom portion, said bottom portion having a semi-cylindrical second threaded nest, said moving part being disposed for movement relative to said fixed part so as to slide past said fixed part to provide a shearing action to a rod carried in said cylindrical threaded first nest and with said rod being engaged by said semi-cylindrical second threaded nest as said moving part slides past said first nest of said fixed part, said semi-cylindrical threaded first and second nests having the same size.

2. The apparatus for cutting threaded rods as claimed in claim 1, wherein the semicylindrical threaded nests (2a and 3a) located in the fixed part (2) and moving part (3) are produced with the same thread as that corresponding to the rods to be cut (5).

3. The apparatus for cutting threaded rods as claimed claim 2, wherein the fixed part (2) comprising a square fixed by a bolt (6) to a frame (1).

4. The apparatus for cutting threaded rods as claimed claim 3, wherein the threaded nests (2a and 3a) coincide with the thread of the rods to be cut (5) when they are applied to the latter.

5. The apparatus for cutting threaded rods as claimed in claim 4, wherein the fixed part (2) and moving part (3) have several threaded nests corresponding to different diameters of threaded rods.

* * * * *